UNITED STATES PATENT OFFICE.

WILLIAM D. SNOW AND DAVID L. SNOW, OF PHILADELPHIA, PENNSYLVANIA.

MANUFACTURE OF LINOLEUM.

948,189.  Specification of Letters Patent.  Patented Feb. 1, 1910.

No Drawing.  Application filed April 13, 1909. Serial No. 489,591.

*To all whom it may concern:*

Be it known that we, WILLIAM D. SNOW and DAVID L. SNOW, citizens of the United States, and residents of the city of Philadelphia, county of Philadelphia, and State of Pennsylvania, have jointly invented certain Improvements in the Manufacture of Linoleum, of which the following is a specification.

Our improvements in the manufacture of linoleum are characterized by the composition of oxidized linseed oil, magnesia and asbestos, used with superior results as to quality and appearance in the production of the various types of the fabric, such as plain, inlaid and granulated linoleum. The oxidized oil, magnesia and asbestos are mixed together, with the combination of the oil and magnesia in greater or less measure, to form a soap, through which the asbestos is disseminated.

In our operations, we have found that a highly satisfactory product is obtained by mixing equal weights of a cement containing (by weight) 100 parts of oxidized linseed oil, 1 part of kauri gum and 1½ parts of rosin, with a compound containing (by weight) 100 parts of magnesia and 18 parts of asbestos. We have also found that a highly satisfactory product is obtained from a composition containing, by weight, 100 parts of the cement specified, 85 parts of magnesia, 15 parts of asbestos, 25 parts of wood flour, and 50 parts of any usual pigment. We have also used with satisfactory results compositions containing various other proportions of oxidized oil, magnesia, and asbestos, with and without reduced wood such as wood flour, sawdust and ground cork. Fabrics produced from these compositions have a fine, glossy, marble-like finish; are fine in texture, flexible and durable; do not absorb readily and are easily cleaned without injury; are economical in the amount of coloring matter required, and are not readily destructible by fire.

Having described our invention, we claim:

1. In the manufacture of linoleum, the combination of oxidized oil, magnesia and asbestos.

2. In the manufacture of linoleum, the combination of oxidized linseed oil, magnesia, and asbestos, in the approximate proportions by weight of 100 parts of oil, 85 parts of magnesia and 15 parts of asbestos.

3. In the manufacture of linoleum, the combination of oxidized linseed oil, magnesia, asbestos and reduced wood.

4. In the manufacture of linoleum, the combination of oxidized linseed oil, kauri gum, rosin, magnesia, asbestos, wood flour matter.

5. In the manufacture of linoleum, the combination of oxidized linseed oil, kauri gum, resin, magnesia, asbestos, wood flour and coloring matter.

In witness whereof we have hereunto set our names this 9th day of April, 1909, in the presence of the subscribing witnesses.

WILLIAM D. SNOW
DAVID L. SNOW.

Witnesses:
ROBERT JAMES EARLEY,
JOS. G. DENNY, Jr.